(12) United States Patent  (10) Patent No.: US 7,860,798 B2
Rubinstein  (45) Date of Patent: Dec. 28, 2010

(54) ELECTRONIC DELIVERY AND MANAGEMENT OF DIGITAL MEDIA ITEMS

(75) Inventor: Jon Rubinstein, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1320 days.

(21) Appl. No.: 11/336,268

(22) Filed: Jan. 20, 2006

(65) Prior Publication Data

US 2007/0174888 A1   Jul. 26, 2007

(51) Int. Cl.
*G06Q 50/00* (2006.01)
*G06Q 99/00* (2006.01)
(52) U.S. Cl. .............................. 705/51; 705/54; 705/59
(58) Field of Classification Search ............... 705/26, 705/27, 51, 54, 59
See application file for complete search history.

(56) References Cited

U.S. PATENT DOCUMENTS

| | | | | |
|---|---|---|---|---|
| 5,884,028 | A * | 3/1999 | Kindell et al. ............... | 709/234 |
| 6,584,450 | B1 * | 6/2003 | Hastings et al. .............. | 705/26 |
| 7,024,381 | B1 * | 4/2006 | Hastings et al. .............. | 705/26 |
| 2003/0040962 | A1 * | 2/2003 | Lewis ........................ | 705/14 |
| 2004/0068451 | A1 * | 4/2004 | Lenk et al. .................. | 705/28 |
| 2004/0133923 | A1 * | 7/2004 | Watson et al. ............... | 725/134 |
| 2005/0192099 | A1 * | 9/2005 | Nguyen et al. ............... | 463/42 |
| 2005/0197855 | A1 * | 9/2005 | Nudd ........................... | 705/1 |
| 2007/0005466 | A1 * | 1/2007 | Rosenblatt et al. ........... | 705/35 |

FOREIGN PATENT DOCUMENTS

JP    2004287514 A  * 10/2004

OTHER PUBLICATIONS

Jantz, R., "E-Books and New Library Service Models: An Analysis of the Impact of E-Book Technology on Academic Libraries," Information Technology & Libraries, vol. 20, No. 2, pp. 104-113, Jun. 2001.*
Gnatek, T., "Libraries Reach Out, Online," New York Times, p. G1, Dec. 9, 2004.*

* cited by examiner

*Primary Examiner*—Nicholas D Rosen
(74) *Attorney, Agent, or Firm*—Fish & Richardson P.C.

(57) ABSTRACT

In an electronic delivery system, digital media items (e.g., videos, music, video games, ebooks, etc.) are stored in an ordered list (e.g., queue) at a provider system. The provider system automatically delivers digital media items to a user system (e.g., via a network connection). The user is permitted to check out (e.g., view, play, read, etc.) a maximum allowed number of items at the user system. If the user checks in an item, or an item expires or is removed from the queue, then the user is permitted to check out (or renew) digital media items in the queue until the maximum allowed number of digital media items are checked out. In some implementations, digital media items are automatically delivered in response to one or more trigger events (e.g., an item is removed from the queue, etc.).

18 Claims, 7 Drawing Sheets

ELECTRONIC DELIVERY AND MANAGEMENT OF DIGITAL MEDIA ITEMS

TECHNICAL FIELD

The disclosed implementations relate generally to digital media distribution services.

BACKGROUND

Advancements in digital media technologies are opening new opportunities for digital media distribution. Various companies, such as Netflix®, Blockbuster® Online, TiVo® and Movielink® have implemented technologies and systems for renting DVDs and other digital media (e.g., videos, music, video games, ebooks, digital photos, etc.) using the Internet.

Netflix® and Blockbuster® provide services that allow users to search movie catalogs and manage an personal movie rental queue online. Physical DVDs of the movies are shipped directly to the user's home and provide return envelopes for returning the DVDs via the postal service. Because these services distribute physical DVDs they typically restrict the number of DVDs that can be simultaneously shipped to each user. These restrictions are due to limitations on inventory and/or agreements with content providers.

A significant drawback with such services is that users must wait 3-4 days for movies to be delivered through the postal service. Moreover, these services will typically not ship new movies until movies are returned by the user which can add even more delay to the process.

Movielink® allows users to electronically rent or purchase movies, TV shows and other popular videos. Users can search categories, pay with credit or debit card, and electronically download purchased or rented movies to their home computers. Included with the service is client software that allows the user to manage and view the downloaded movies. Movies can be stored for a period of up to 30 days and viewed an unlimited number of times in a 24 hour viewing period starting when the user first "plays" the movie.

Although Movielink® improves upon services that manage physical inventory, the user must purchase or rent each movie (no subscription service is provided), then wait for the movie to be downloaded to their computer (e.g., 30-90 minutes for a full download). Such delay prevents the user from instantly accessing movies which can diminish the overall user experience. Although Movielink® attempts to shorten download time (2-10 minutes) by allowing the user to view the movie during download, this feature does not allow simultaneous instant access to multiple movies.

TiVo® automatically finds and digitally records scheduled television broadcasts. The TiVo® service includes a Wishlist® feature that automatically searches and records schedule television broadcasts based on user search criteria.

SUMMARY

An electronic delivery system stores an ordered list (e.g., a queue) of digital media items (e.g., videos, music, video games, ebooks, etc.) at a provider system. The provider system delivers digital media items to a user system (e.g., via a network connection). The user is permitted to access or check out (e.g., view, play, read, etc.) up to a maximum allowed number of digital media items at the user system. If the user "checks in" a digital media item, or if the permitted viewing window for a checked out item expires, then the user is permitted to check out (or renew) digital media items in the queue until the maximum allowed number of digital media items are checked out. In some implementations, additional items are automatically delivered in response to one or more trigger events (e.g., an item is removed from the queue, etc.).

In some implementations, a computer-implemented method of managing digital media items includes: receiving by electronic delivery a plurality of digital media items specified in an ordered list of digital media items which can be updated by a user; receiving a first request to electronically check out a first digital media item; determining if a maximum allowed number of digital media items have been checked out; and denying the first request if the maximum allowed number of digital media items have been checked out.

In some implementations, a computer-implemented method of electronically delivering digital media items to a user system includes: maintaining a list of digital media items to be electronically delivered to a user system; prior to electronically delivering a digital media item from the list, checking to see whether a maximum allowed number of digital media items have been previously delivered to the user system; and electronically delivering a digital media item from the list if the maximum allowed number of digital media items have not been delivered to the user system.

In some implementations, a method of electronically delivering digital media items to a user system includes: maintaining an ordered list of digital media items to be electronically delivered to a user system; electronically delivering one or more digital media items from the list to the user system; receiving an indication that at least one digital media item previously delivered to the user system has been disabled; and in response to the indication, permitting an additional digital media item from the list to be electronically delivered to the user system.

In some implementations, a computer-implemented method of managing electronic access of digital media items by a user system includes: receiving by electronic delivery one or more digital media items from an ordered list of digital media items; receiving a first request to check out a first digital media item at the user system; and denying the first request if a maximum allowed number of digital media items have been previously checked out at the user system.

In some implementations, a computer-implemented method of electronically delivering digital media items to a user system includes: maintaining an ordered list of digital media items to be electronically delivered to a user system; electronically delivering one or more digital media items from the list to the user system until a maximum allowed number of digital media items have been delivered; receiving an indication that at least one digital media item previously delivered to the user system has expired; and in response to the indication, permitting the expired digital media item to be renewed by a user at the user system.

In some implementations, a computer-implemented method of managing access to digital media items includes: receiving multiple digital media items electronically downloaded from a provider system to a user system; receiving a request to simultaneously access M digital media items at the user system, where M is an integer value greater than or equal to one; determining if access to M digital media items is restricted; permitting access to M digital media items if access is not restricted; and permitting access to less than M digital media items if access is restricted.

Other implementations are described herein, including but not limited to implementations associated with computer-readable mediums, systems and devices.

DETAILED DESCRIPTION

Electronic Delivery System Overview

Figure 1:
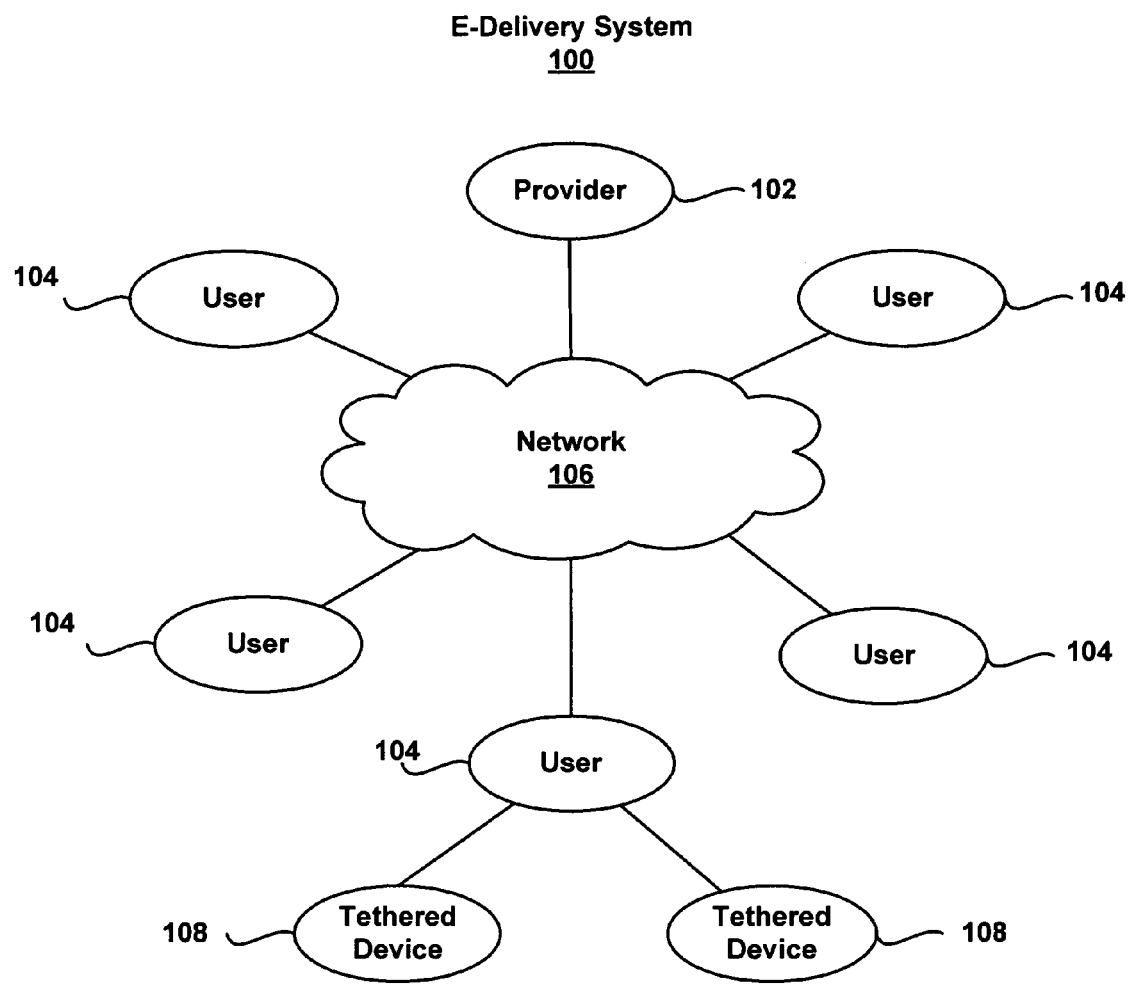
FIG. 1 is a block diagram of an electronic delivery system.

FIG. 1 is a block diagram of an electronic delivery ("e-delivery") system 100. In some implementations, the system 100 includes a provider system 102 (e.g., digital media distribution server) and one or more user systems 104 (e.g., personal computer, mobile phone, laptop, personal digital assistant, media player, email device, DVD player, digital media receiver, digital audio receiver, etc.) coupled to one or more networks 106 (e.g., the Internet, intranet, local area network, wireless network, etc.).

A user system 104 can be adapted to couple to one or more tethered devices 108 (e.g., a media player, mobile phone, smart phone, CD-ROM, etc.). A "tethered" device is a device that can connect or couple to a user system 104 and receive content and/or digital rights (e.g., licenses) from or through the user system 104. For example, a digital media player can be a tethered device 108 that connects to the port of a computer (e.g., Universal Serial Bus (USB), FireWire, wireless, etc.) and receives content and/or digital rights associated with content. In some instances, a tethered device 108 may acquire content and/or digital rights by synchronizing with a user system 104 or another device connected to the user system 104 (e.g., a docking station or cradle).

In some implementations, the provider system 102 is operated by a content aggregator that aggregates digital media items (e.g., videos, music, video games, ebooks, digital photos, etc.) from one or more content owners (e.g., publishers), and distributes the content to users over the network 106. The content can be distributed using a digital rights management (DRM) framework which controls how the content is licensed, distributed, accessed, viewed and used. In some implementations, the provider system 102 encrypts and packages content, together with one or more rules which govern how the content can be accessed, viewed, copied, distributed, etc.

In some implementations, the provider system 102 operates a web page server (FIG. 6) that serves interactive web pages to user systems 104 over the network 106. The interactive web pages allow users to search and browse content catalogs stored at the provider system 102. The user is allowed to manage a personal list or queue of digital media items (hereinafter also referred to as "items"). The term "items" can include content and any other data or information that can be packaged or bundled with the content, such as DRM information (e.g., rules encryption keys), advertisements, movie trailers, software, movie guides, transaction information, etc.

The user can add and remove items to and from their personal queue using various user interface elements (e.g., push buttons, menus, links, dialog boxes, etc.). The provider system 102 can also facilitate the purchase or rental of items, and gathers information for this purpose (e.g., setting-up user accounts and profiles). The provider system 102 is also responsible for establishing and maintaining network connectivity for electronic delivery of items to user systems 104 over the network 106. The provider system 102 may be operated on a server, which for these purposes may include a network of multiple interconnected computers and storage elements.

The user system 104 may be a personal computer, or any similar computing device with the ability to send and receive data via a network 106. The user system 104 can have the ability to share digital media items with tethered devices 108 and manage the access rights of tethered devices 108 to digital media items. For example, the user system 104 can include a digital rights management (DRM) system or process that ensures that tethered devices 108 comply with DRM rules imposed by a provider system 102, or by a third party content owner, such as, for example, restricting the number of copies that can be made, ensuring that appropriate licenses have been acquired, verifying that the tethered device has a secure processing environment, etc.

Media Access Process Flow

Figure 2A:
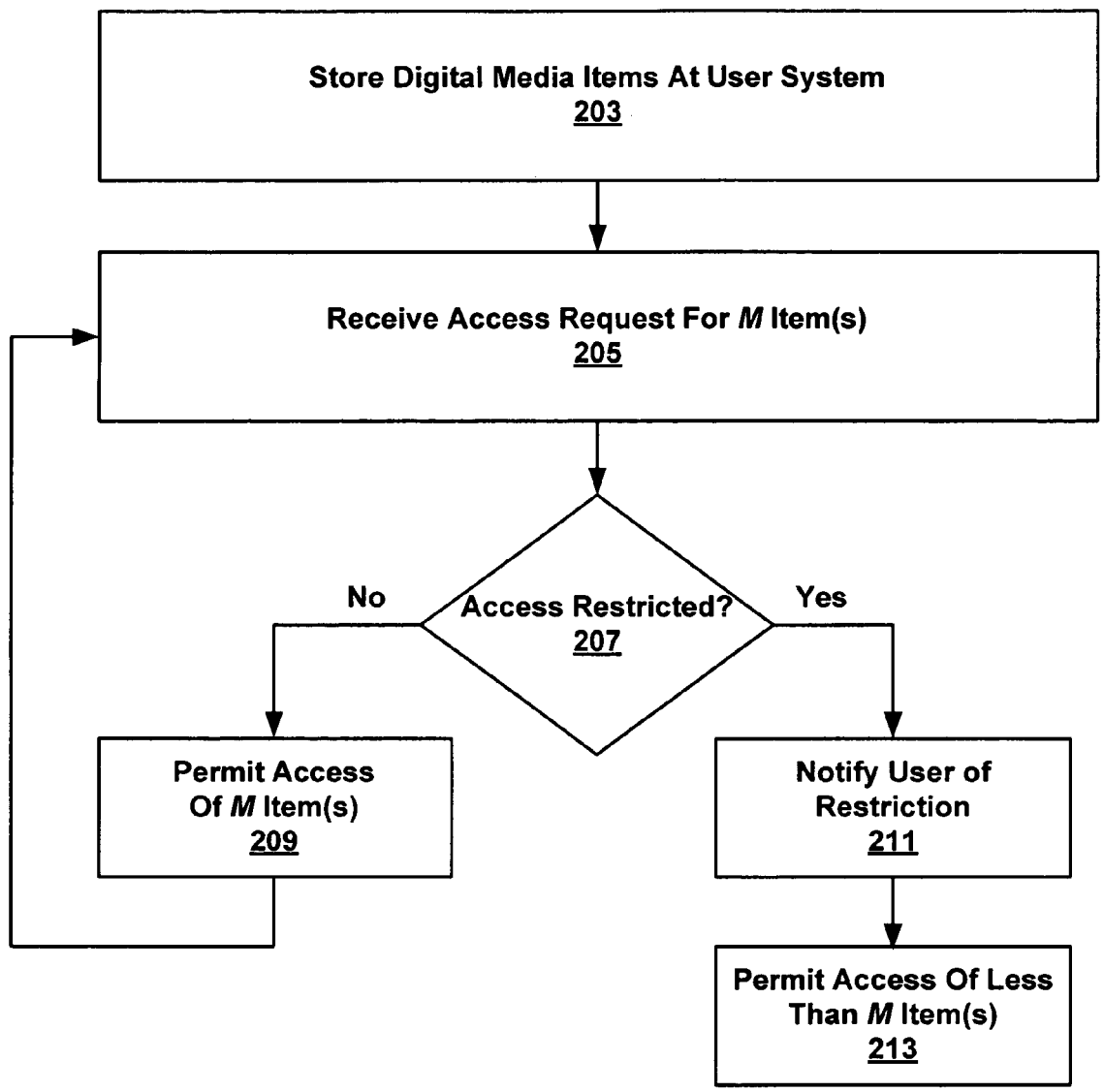
FIG. 2A is a flow diagram of a media access process.

FIG. 2A is a flow diagram of a media access process 201. In some implementations, the number of digital media items that can be simultaneously accessed is restricted at the user system. Some of the steps of process 201 can be executed concurrently using one or more threads (e.g., multi-threading environment) and/or one or more processors (e.g., parallel processors).

In some implementations, a provider system downloads digital media items to a user system where the items are stored for subsequent retrieval by a user (203). The user system receives an access request from the user for simultaneously accessing M item(s) (205), where M is an integer greater than or equal to one. If the check out is restricted (207), then the user is notified of the restriction (211) and permitted to access less than M items(s) (213). Otherwise, the user is permitted to access the M requested item(s) (209). The number of permitted accesses may also allow for access by one or more tethered devices 108. For example, the user may be allowed to simultaneously access up to M items using any combination of tethered devices 108, or from only certain types or classes of tethered devices 108. For example, the user may be allowed to transfer a song to a digital media player through a USB cable, but is restricted from burning the song to disc. Thus, the user system 104 can be responsible for managing access permissions or restrictions for itself and for any tethered devices 108 connected or coupled to the user system 104. The specifics of access management can be specified by the provider system 102 or a third party content provider.

In some implementations, access restrictions are enforced using known DRM solutions and information residing at the user system and/or bundled or integrated with the digital media items (e.g., digital watermarks, etc.). For example, DRM software can monitor or track the number of items simultaneously accessed, and restrict access if the number exceeds a predetermined maximum number. In other implementations, the provider system monitors and enforces access restrictions (e.g., authorizes and de-authorizes access) at the user system by at least intermittently monitoring access requests and activities at the user system and/or by receiving notification or reports from the user system. In still other implementations, access restriction and enforcement is implemented by the combined actions of the user system, the provider system and a third party system (e.g., a content clearing house, license administrator, etc.).

E-Delivery Process Flow

Figure 2B:
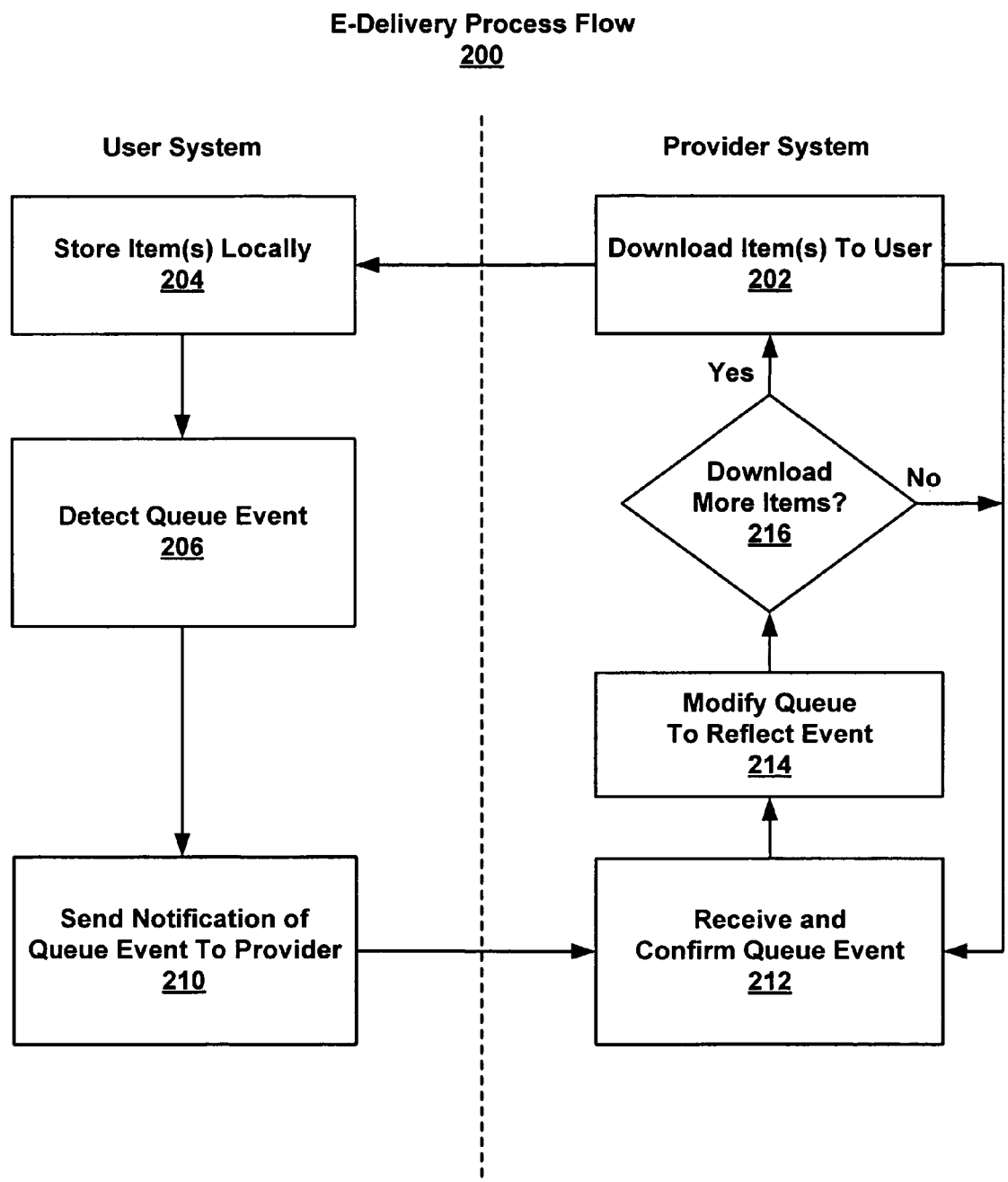
FIG. 2B is a flow diagram of an electronic delivery process.

FIG. 2B is a flow diagram of an electronic delivery process 200. In some implementations, the process 200 downloads one or more items to a user system. The items are stored at the user system and can be accessed and managed via a user interface, as described with respect to FIG. 4. Some of the steps of process 200 can be executed concurrently using one or more threads (e.g., multi-threading environment) and/or one or more processors (e.g., parallel processors). The process 200 includes downloading events and access events. These events can operate independent of each other or in combination, and each event can be managed separately for purposes of DRM.

Downloading Digital Media Items

The process 200 begins by electronically downloading items listed in a user's queue to a user system (202). In some implementations, the number of items that can be downloaded is restricted due to memory constraints of the user system and/or legal restrictions imposed by content publishers. The items are stored locally at the user system (204). The items can be stored on any suitable storage medium, such as a hard drive, Flash memory or the like. Once the items are stored, the user can "check out" one or more items via a user interface, as described with respect to FIGS. 2A, 3 and 4.

The items may be downloaded (with or without numerical limits) automatically by the provider system, or upon explicit request by a user system. The download can occur overnight or during periods of inactivity of the provider system, the user system, and/or the network. The download may be automatically planned to balance limited storage capacity at the user system against the desire to have enough content downloaded to the user system at the time of a desired access so that no waiting is required before viewing is possible (i.e., "instant access").

Accessing Digital Media Items

The user is permitted to check out up to a maximum number of items (e.g., three). Such a restriction can result from license restrictions imposed on the provider by content sources or owners. Once a maximum number of items is checked out, additional items cannot be checked out until the user "checks in" one of the "checked out" items and/or removes an item from their queue, as described with respect to FIGS. 3 and 4.

In some implementations, items can expire after a period of time. For example, certain items can be restricted to a 30 day storage period. At the end of the 30 day storage period, the item expires, e.g., a digital rights management (DRM) client (e.g., DRM client 534 shown in FIG. 5) prevents further access to that item by the user system 104. Alternatively, items can be restricted to a viewing period (e.g., 24 hours) which allows the user to view the item as often as they like during the viewing period. If an item expires it can be automatically disabled or removed from the storage device.

In some implementations, certain activities at the user system are detected as trigger events (206). Generally, a trigger event (hereinafter also referred to as a "queue event") is any action taken on the user's queue whether initiated by the user, the user system or the provider system. Some examples of queue events include but are not limited to: 1) the expiration of an item in the queue, 2) the removal of an item from the queue, 3) the renewal of an expired item in the queue, 4) the addition of a new item in the queue, and 5) the reordering of items in the queue.

The user system sends a notification of the queue event to the provider system (210). The provider system receives the notification (212) and optionally confirms the queue invent. For example, the process 200 may confirm the any expired or removed items have been disabled. In some implementations, the provider system initiates a confirmation procedure at the user system that verifies that the item was disabled. In other implementations, a confirmation procedure at the provider system confirms that items are disabled. The confirmation procedure can be performed using any combination of known DRM techniques or other content security solutions or frameworks.

After the queue event is confirmed, the queue is modified to reflect the queue events (214). If the queue event allows for the download of additional items to the user system (216), then the provider system determines how many additional items can be downloaded to the user device without exceeding the maximum allowed number and downloads that number of items (202). For example, if a user removes an item from their queue (a queue event), then the provider system retrieves the next item (e.g., top of the queue) from the user's personal queue and automatically downloads or otherwise delivers the item to the user system for instant access by a user. In some implementations, the items (or portions thereof) are delivered by a caching server and/or a third party system (e.g., a content clearing house, license provider, etc.).

In some implementations, the user is provided an option to renew an expired item. If an item expires it can be advantageous to keep the item stored at the user system and provide an opportunity for the user to renew the item. If the user does not renew the expired item within a renewal period (e.g., 48 hours), then the item can be automatically removed from the user system. The removal of the item is detected and the provider system is notified. If the user renews the expired item, then the item will be re-enabled by the provider system without having to download the item from the provider system.

It should be apparent that a variety of trigger events (other than queue events) can be detected and acted upon by the provider system. For example, a trigger event can also occur if the maximum number of items allowed to be stored at the user system is increased (e.g., a subscription upgrade).

The process 200 described above enables a user to download in the background a maximum number of items from the their personal queue for viewing at any time, subject to any agreed upon restrictions regarding viewing and storage. The items can be downloaded as a background process while the user is viewing or using an item or even when the user is offline. The maximum allowed number of items stored at the user system can be greater than maximum allowed number of items that can be simultaneously checked out by a user.

In some implementations, the provider system delivers items to the user system, but does not maintain the user queue or enforce the access rights of the user. In such an implementation, the queue and access rights can be enforced by the user system and/or one or more other systems, such as a third party system (e.g., content owner system or clearing house, etc.).

An advantage of the process 200 is that it limits the number of items that can be simultaneously accessed and/or viewed at the user device, while still providing the user with instant access to those items. Thus, the process 200 enables restrictions on content to be enforced without compromising the "instant access" user experience.

Check-In/Check-Out Process Flow

Figure 3:
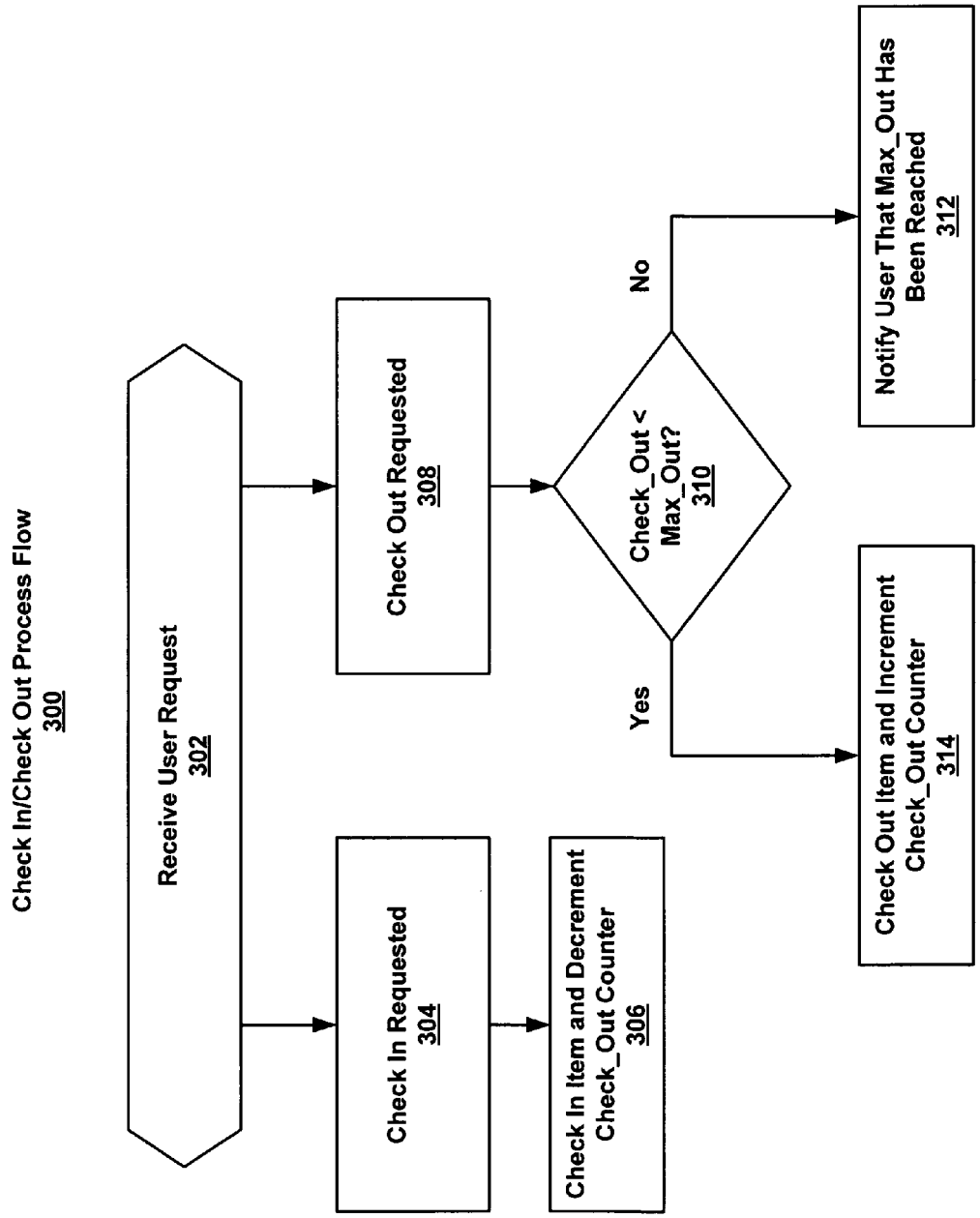
FIG. 3 is a flow diagram of a check in/check out process.

FIG. 3 is a flow diagram of a check in/check out process 300. In some implementations, the process 300 is performed at a user system. Some of the steps of process 300 can be executed concurrently using one or more threads (e.g., multi-threading environment) and/or one or more processors (e.g., parallel processors).

The process 300 begins when a user's request to access an item (i.e., "check out" an item) or "check in" an item is received by the user system (302). In some implementations, the request can be made through a user interface element, as described with respect to FIG. 4. In other implementations, the request can be made through a hardware device (e.g., a remote control, mobile phone, media player, etc.). If the user requests to check-in an item (304), the item is checked in and a check_out counter (e.g., check_out counter 530 in FIG. 5) is decremented (306). The check_out counter maintains a current count of the number of items that are concurrently checked out by the user. In some implementations, the check_out counter is a software timer and initialized to zero when the user system is booted up.

If the user requests to check out an item (308), then the current value of the check_out counter is compared against a max_out parameter (e.g., max_out parameter 532 in FIG. 5) to determine if the maximum number of checked out items has been reached (310). The max_out parameter stores an integer value that represents the maximum number of items that can be concurrently checked out by a user. This limit may be set, for example, by the terms of the user's agreement with the content service provider. If the check_out counter is equal to or exceeds max_out, then the user is notified that the maximum number of items have been checked out and the user is not permitted to check out the item (312). This notification can be a message or alert presented to the user via a user interface element. If check_out is less than max_out, then the user is permitted to check out the item and the check_out counter is incremented (314).

Queue User Interface

Figure 4:
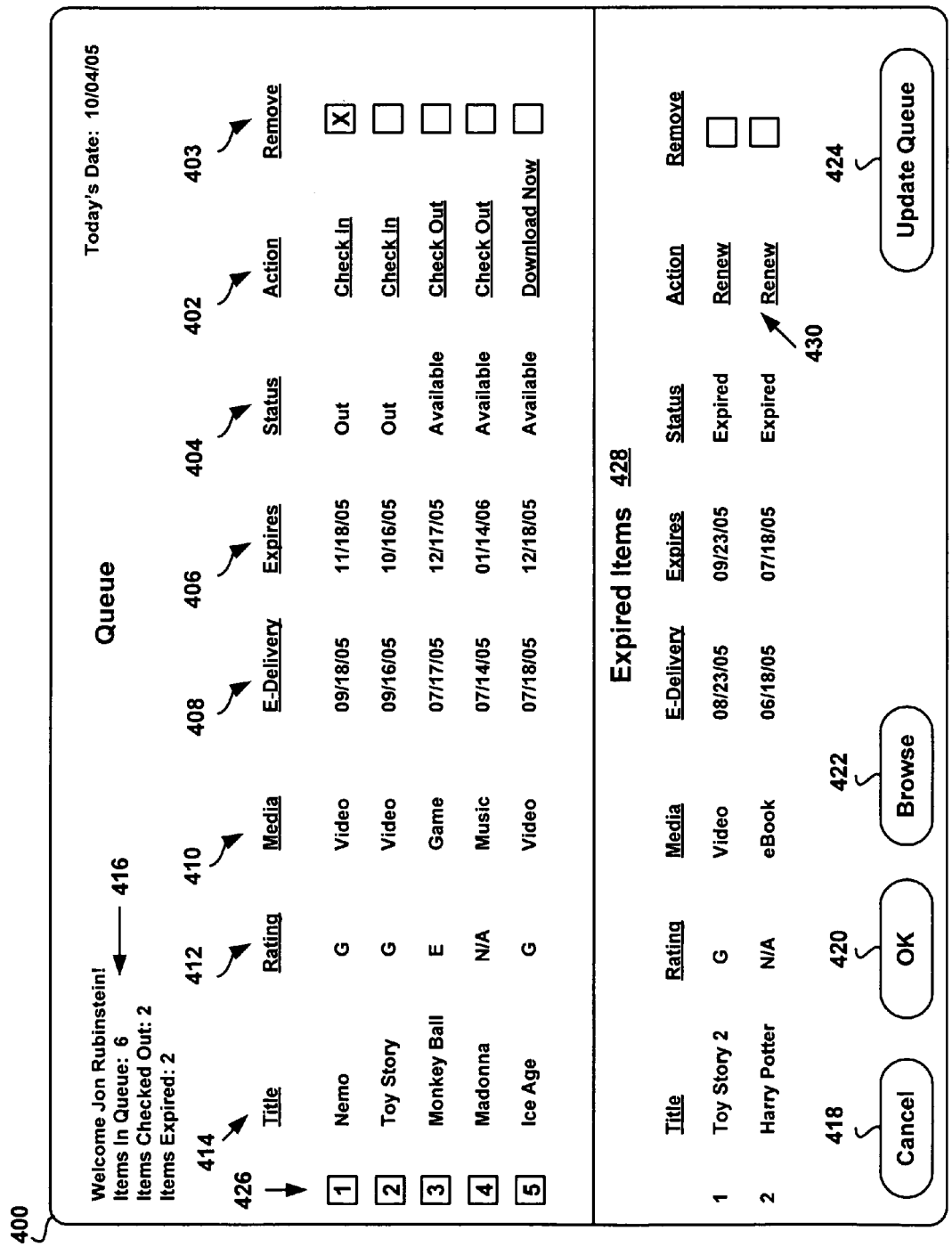
FIG. 4 illustrates a user interface for managing a queue of digital media items.

FIG. 4 illustrates a user interface 400 for managing a queue or list of digital media items. The user interface 400 enables a user to manage a personal queue of digital media items to be electronically accessed. FIG. 4 assumes that the user has already browsed a content catalog and added items to the queue.

In some implementations, the user interface 400 includes an ordered list of items which are numbered from 1 to N. The queue can include items that are currently stored at the user system 104 and items that have not yet been electronically downloaded. The user interface 400 may also include a queue summary 416 which summarizes information about the queue, such as the number of items in the queue, the number of items checked out (e.g., the current value of check_count), the number of expired items and the like. In this example, the queue summary 416 shows that the user has five items in the queue. Six items were previously downloaded to the user system for instant access. Two items are checked out (Nemo™, Toy Story™), two items are available for check-in (Monkey Ball™, Madonna) and two items are expired (Toy Story™ 2, Harry Potter™). The expired items are displayed in a section 428 of the user interface 400.

The user interface 400 includes control buttons 418, 420, for canceling an action and exiting the user interface 400, and a button 424 for updating the queue. There is also a button 422 for browsing a content catalog which allows the user to select items to be added to the queue.

In some implementations, each item has eight fields: title 414, rating 412, media 410, e-delivery 408, expires 406, status 404, action 402 and remove 403. The title 414, rating, 412 and media 410 fields are self-explanatory. The e-delivery field 408 shows the status of electronic delivery. If delivery was successful, then the date of delivery is shown. If the item was not downloaded or the download failed for any reason, the e-delivery field 408 reflects such status. The expires field 406 shows the date of expiration for items that can expire. The status field 404 shows the current status of items (e.g, out, expired, available, etc.). The action field 402 provides actions that are appropriate based on the status field 404 of the items. In some implementations, the actions are links that can be clicked by the user to invoke the described action, as described below with respect to FIG. 4.

Referring to FIG. 4, item 1 is checked out so the allowed action is to check in the item. If the user clicks the check-in link in the action field 402 for item 1, then item 1 will be checked in. Item 3 is checked-in and stored at the user system for instant access. Thus, item 3 is "available" to be checked out and this action is reflected in the action field 402 for item 3. If the user clicks the check-out link, then item 3 will be checked-out, provided the user has not already checked out the maximum allowed number of items that can be concurrently checked out, as described with respect to FIG. 3.

The remove field 403 includes check-boxes that can be checked by the user to mark an item for removal. An item is removed from the queue when the user clicks on the update queue button 424. The user interface 400 can be refreshed to display an updated queue.

In this example, two previously downloaded items (Toy Story™ 2, Harry Potter™) that have expired are displayed in a renewal section 428 of the user interface. Since these items have expired, the allowed action for these items is to renew. If the user clicks a renew link 430 in the action field for these items, then the items are renewed. For example, clicking the renewal link 430 can cause the item to be re-enabled. If the user clicks the renewal link 430, the user can check out the item again, provided that the user has not exceeded the maximum allowed number of items that can be simultaneously checked out or is not otherwise restricted (e.g., subscription has expired). If access is denied, the user can be prompted to check in an item or to contact the provider system 102 to upgrade their subscription to increase the number of items that can be simultaneously accessed.

It should be apparent that the order in which items are listed in the queue implies the order in which the user wants to access the items. Items in the queue can be reordered by the user. Reordering the queue may be significant for items that have not been downloaded, since items at the top of the queue may be downloaded first. That is, the automatic download of an item can be based on its position in the queue. Items can be reordered in the queue by changing the number in the items field 426 and clicking the update queue button 424. Alternatively, the items can be reordered in the queue by clicking and dragging an item title to the desire location in the queue which will cause the item to be inserted at that location.

Referring to FIG. 4, item 5 is an example of a digital media item that is in the user's queue but has not yet been downloaded. This may be because the user system 104 is full or because the provider system 102 and/or user system 104 have determined that download is unnecessary or untimely. The number and timing of downloads may be controlled by user preferences set at the user system 104 or provider system 102. In any event, one possible action with respect to any digital media item on a user's queue is "download now," which may cause the item to be downloaded at the next available opportunity without regard to its position in the queue.

It should be apparent, that the user interface 400 is one example of a user interface for media queue. Other user interfaces can be used with more or fewer fields and controls, as desired.

Figure 5:
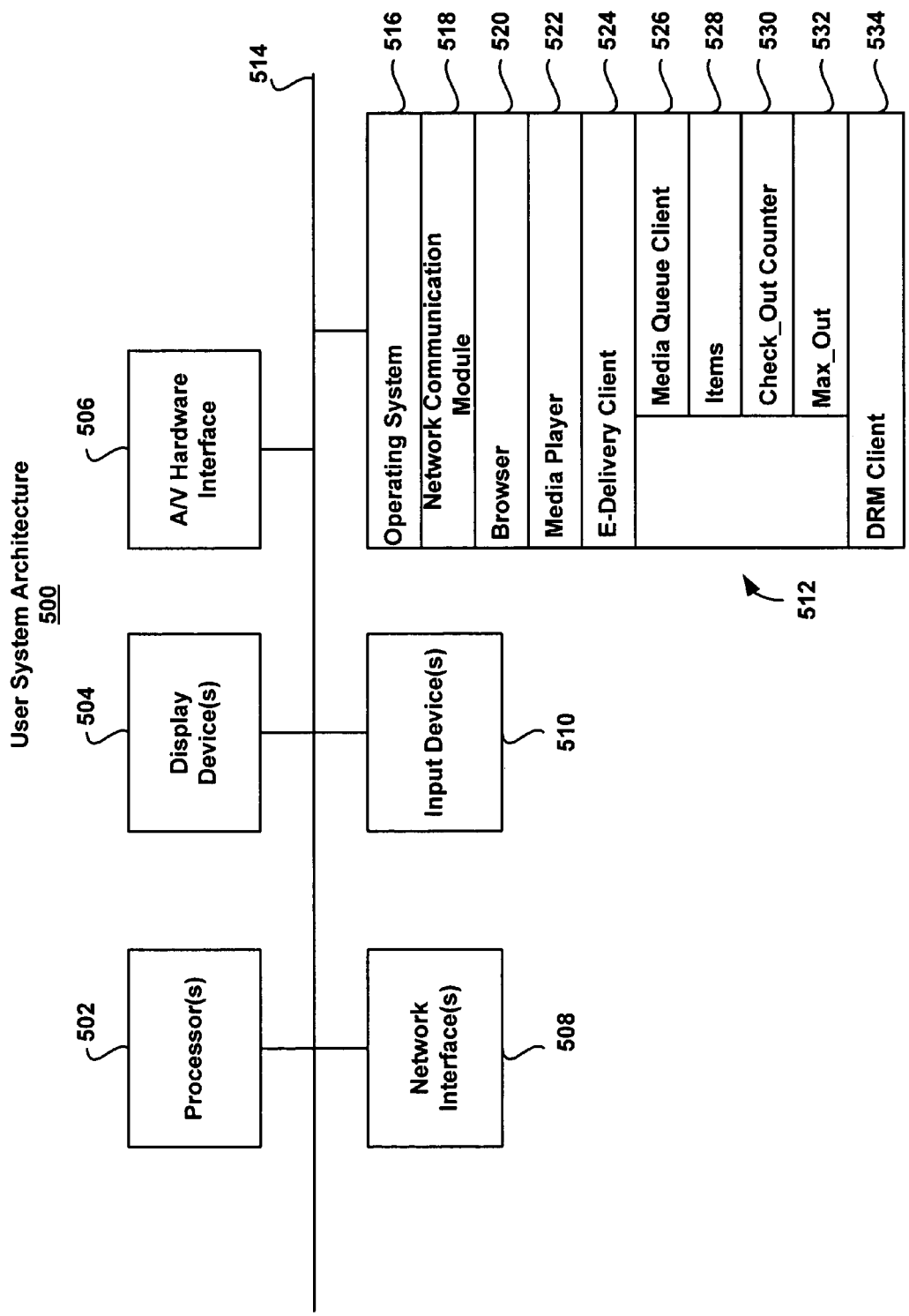
FIG. 5 is a block diagram of a user system architecture for electronically receiving and managing access to digital media items.

FIG. 5 is a block diagram of an exemplary user system architecture 500 capable of electronically receiving and managing access to digital media items. The architecture 500 includes one or more processors 502 (e.g., PowerPC®, Intel Pentium® 4, etc.), one or more display devices 504 (e.g., CRT, LCD), an audio/visual (A/V) interface 506 (e.g., for connecting to a television receiver), a network interface 508 (e.g., Ethernet connection, FireWire, USB, etc.), input devices 510 (e.g., keyboard, mouse, etc.), and one or more computer-readable mediums 512 (e.g., RAM, ROM, SDRAM, hard disk, optical disk, flash memory, L1 and L2 cache, etc.). These components exchange communications and data via one or more buses 514 (e.g., EISA, PCI, PCI Express, etc.).

The term "computer-readable medium" refers to any medium that participates in providing instructions to a processor 502 for execution, including without limitation, non-volatile media (e.g., optical or magnetic disks), volatile media (e.g., memory) and transmission media. Transmission media includes, without limitation, coaxial cables, copper wire and fiber optics. Transmission media can also take the form of acoustic, light or radio frequency waves.

The computer-readable medium 512 further includes an operating system 516 (e.g., Mac OS®, Windows®, Linux, etc.), a network communication module 518, a browser 520 (e.g., Microsoft® Internet Explorer, Netscape®, Safari®, etc.), a media player 522 and an e-delivery client 524.

The operating system 516 can be multi-user, multiprocessing, multitasking, multithreading, real-time and the like. The operating system 516 performs basic tasks, including but not limited to: recognizing input from input devices 510; sending output to display devices 504; keeping track of files and directories on computer-readable mediums 512 (e.g., memory or a storage device); controlling peripheral devices (e.g., disk drives, printers, A/V interface 506, etc.); and managing traffic on the one or more buses 514. The network communications module 518 includes various components for establishing and maintaining network connections (e.g., software for implementing communication protocols, such as TCP/IP, HTTP, Ethernet, etc.). The browser 520 enables the user to search a network (e.g., Internet) for information (e.g., digital media items). The media player 522 (e.g., Quick Time®, Windows Media Player®, Real Player®, etc.) enables the user to view content.

The user system can be a television set-top box, DVD player, digital media receiver, digital audio receiver, mobile phone or other handheld device, and the like. Such systems may implement a modified architecture 500 using a combination of hardware and software.

The e-delivery client 524 provides various software components for performing the various functions for e-delivery and queue management, as described with respect to FIGS. 2-5. The e-delivery client 524 includes a media queue manager 526, items 528, a check_out counter 530, a max_out parameter 532 and a DRM client 534. The media queue client 526 includes software components for presenting and updating the queue, as described with respect to FIG. 4. The items 528 are digital media items that have been downloaded to the user system. The check_out counter 530 and max_out parameter were described with respect to FIG. 3. The DRM client 534 ensures the integrity of DRM protected items at the user system, and includes components for disabling DRM protected items or revoking some or all the rights associated with the DRM items.

Figure 6:
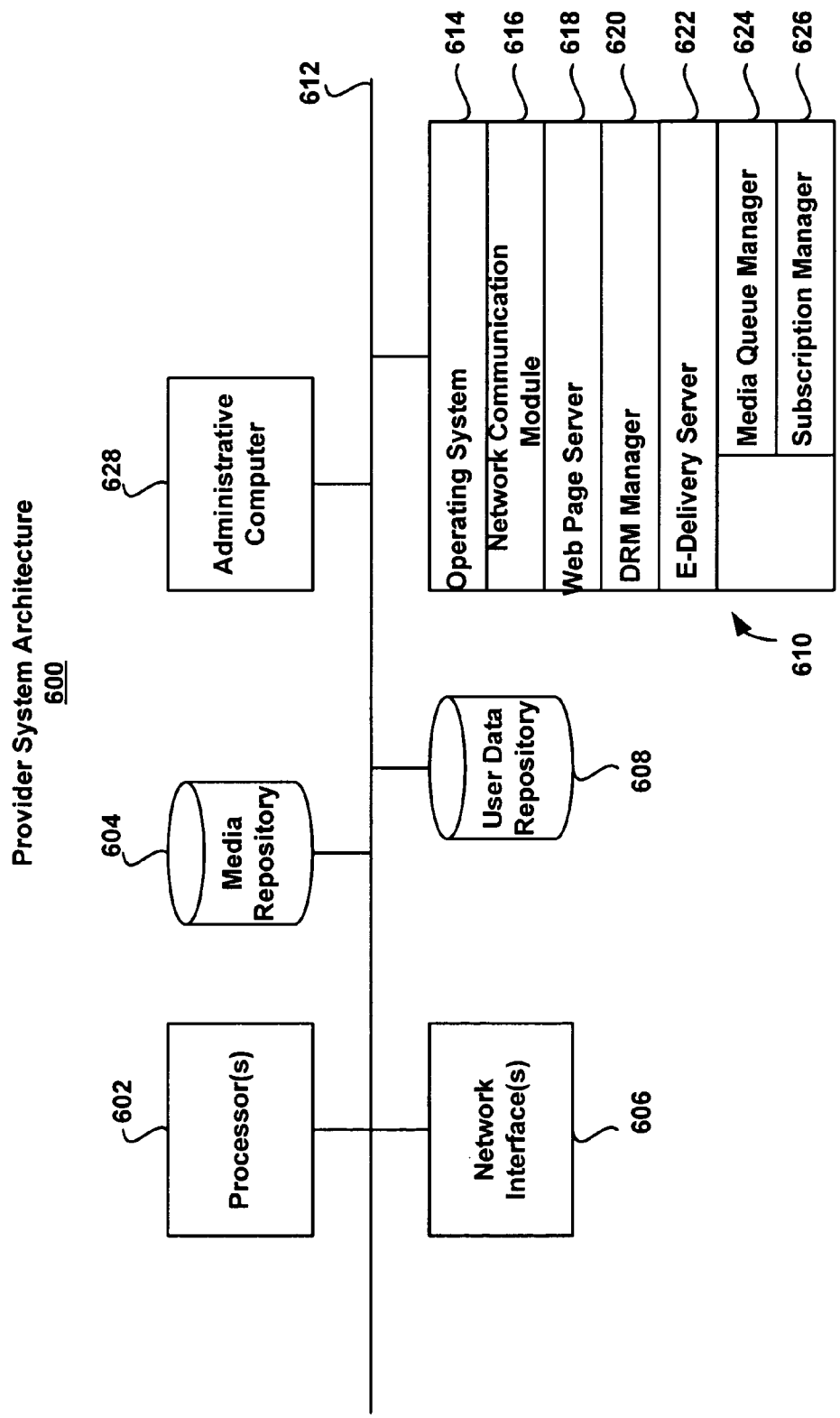
FIG. 6 is a block diagram of a provider system architecture for electronically delivering and managing digital media items.

FIG. 6 is a block diagram of an exemplary provider system architecture 600 capable of electronically delivering and managing digital media items. The architecture 600 includes one or more processors 602, a media repository 605, network interfaces 606, user data repository 608 and one or more computer-readable mediums 610. Each of these components communicate with each other over one or more buses 612.

Also included is an administrative computer 628, which enables a system administrator to manage various administrative tasks, such as managing user accounts, profiles, etc. The media repository 604 stores digital media items for download to users. The user data repository 608 stores user account information and profiles. The repositories 604, 608, can be stored on the same storage device or separate storage devices. The network interfaces 606 enable items to be downloaded to users over a network (e.g., the Internet).

The computer-readable mediums 610 further include an operating system 614 (Mac OS® Server, Windows® NT, etc.), a network communications module 616, a web pager server 618, a DRM manager 620 (e.g., Windows Media® DRM) and an e-delivery server 622 for managing the downloading of items to user systems.

The operating system 614 and network communications module 616 operate as previously described with respect to FIG. 5. The web page server 618 serves web pages to user systems. For example, the web page server 618 can serve a web page to a user system that includes the user interface 400. The DRM manager 620 is responsible for various DRM management functions at the provider system. For example, the DRM manager 620 can provide a framework for packaging and encrypting items for electronic delivery, and also provide a mechanism for including and modifying rules for governing access and use of items.

The e-delivery server 622 further includes a media queue manager 624 and a subscription manager 626. The media queue manager 624 works with the media queue client 526 at the user system to manage and update the user's queue. The subscription manager 626 manages user subscriptions.

Various implementations have been described. These implementations can be modified and still remain within the scope of the following claims.

What is claimed is:

1. A computer-implemented method of managing digital media items at a user system, comprising:
receiving, by electronic delivery, a plurality of digital media items specified in a list of digital media items maintained by a provider system;
storing the received digital media items at the user system;
receiving at the user system a first request to electronically check out a first digital media item from the user system;
determining if a maximum allowed number of digital media items have been checked out from the user system by comparing a count representing the current number of checked out digital media items with the maximum allowed number of digital media items;
denying the first request if the maximum allowed number of digital media items have been checked out from the user system;
incrementing the count if the first request is granted;

receiving a second request to electronically check in a second digital media item that had been previously checked out;

in response to the second request, checking-in the second digital media item; and decrementing the count.

2. The method of claim 1, wherein the maximum allowed number of digital media items that can be checked out is less than the plurality of digital media items electronically delivered.

3. The method of claim 1, wherein receiving a first request to electronically check out a digital media item includes receiving input from a user via a user interface displayed at the user system.

4. A computer-implemented method of managing electronic delivery of digital media items from a provider system to a user system, comprising:

receiving, by electronic delivery, one or more digital media items from an ordered list of digital media items maintained by the provider system;

storing the received digital media items at the user system;

receiving at the user system a first request to check out a first digital media item at the user system;

denying the first request if a maximum allowed number of digital media items have been previously checked out at the user system;

receiving a second request to check in a second digital media item at the user system;

in response to the second request, checking in the second digital media item at the user system;

receiving a third request to check out a third digital media item at the user system; and in response to the third request, permitting the third digital media item to be checked out at the user system.

5. A computer-implemented method of electronically delivering digital media items to a user system, comprising:

maintaining on a provider system an ordered list of digital media items to be electronically delivered to a user system;

electronically delivering one or more digital media items for the list to the user system;

receiving at the provider system an indication from the user system that at least one digital media item previously delivered to the user system has expired; and in response to the indication and a first request, permitting the expired digital media item to be renewed by a user at the user system, where the first request is a request received at the user system to check out a first digital media item at the user system.

6. A computer-readable, non-transitory storage medium having stored thereon instructions, which, when executed by a processor, causes the processor to perform the operations comprising:

receiving, by electronic delivery, a plurality of digital media items maintained by a provider system, wherein the digital media items are included in an ordered list of digital media items;

storing the received digital media items at the user system;

receiving at the user system a first request to electronically check out a first digital media item;

determining a count of digital media items for which a check out request was previously granted;

granting the first request if the the count is less than a threshold number;

incrementing the count;

receiving a second request to electronically check in a second digital media item that had been previously checked out;

in response to the second request, checking-in the second digital media item; and decrementing the count.

7. The computer-readable, non-transitory storage medium of claim 6, wherein the threshold number is less than the plurality of digital media items electronically delivered.

8. The computer-readable, non-transitory storage medium of claim 7, wherein receiving a first request to electronically check out a digital media item includes receiving input from a user via a user interface displayed at the user system.

9. A computer-readable, non-transitory storage medium having stored thereon instructions, which, when executed by a processor, causes the processor to perform the operations comprising:

receiving, by electronic delivery, a plurality of digital media items specified in a list of digital media items maintained by a provider system;

storing the received digital media items at the user system;

receiving at the user system a first request to electronically check out a first digital media item from the user system;

determining if a maximum allowed number of digital media items have been checked out from the user system;

denying the first request if the maximum allowed number of digital media items have been checked out from the user system;

receiving a second request to check in a second digital media item;

in response to the second request, checking in the second digital media item;

receiving a third request to check out a third digital media item; and in response to the third request, permitting the third digital media item to be checked out.

10. A computer-readable, non-transitory storage medium having stored thereon instructions, which, when executed by a processor, cause the processor to perform the operations comprising:

maintaining on a provider system an ordered list of digital media items to be electronically delivered to a user system;

electronically delivering one or more digital media items for the list to the user system until a maximum allowed number of digital media items have been delivered;

receiving at the provider system an indication from the user system that at least one digital media item previously delivered to the user system has expired; and in response to the indication and a first request, permitting the expired digital media item to be renewed by a user at the user system, where the first request is a request received at the user system to check out a first digital media item at the user system.

11. The computer-readable, non-transitory storage medium of claim 10 where receiving an indication that at least one digital media item previously delivered to the user system has expired, further comprises:

receiving an indication that a time period for reviewing the digital media item at the user system expired.

12. A system for managing requests for access to digital media items, comprising:
- a processor;
- a computer-readable medium coupled to the processor and having stored thereon instructions, which, when executed by the processor, causes the processor to perform the operations of:
- receiving, by electronic delivery, a plurality of digital media items specified in a list of digital media items maintained by a provider system;
- storing the received digital media items at the system;
- receiving at the system a first request to electronically check out a first digital media item from the system;
- determining if a maximum allowed number of digital media items have been checked out from the system by comparing a count representing the current number of checked out digital media items with the maximum allowed number of digital media items;
- denying the first request if the maximum allowed number of digital media items have been checked out from the system;
- receiving a second request to electronically check in a second digital media item that had been previously checked out;
- in response to the second request, checking-in the second digital media item; and
- decrementing the count.

13. A computer-implemented method of managing access to digital media items, comprising:
- receiving at a user system multiple digital media items electronically downloaded from a provider system;
- receiving at the user system a request to simultaneously access M digital media item(s) at the user system, where M is an integer value greater than or equal to one;
- determining if access to M digital media item(s) is restricted;
- permitting access to M digital media item(s) if access is not restricted; and
- permitting access to less than M digital media item(s) if access is restricted.

14. The method of claim 13, further comprising:
- incrementing a count each time a digital media item is accessed.

15. The method of claim 14, further comprising:
- receiving a request to electronically check in a previously accessed digital media item;
- in response to the request, checking-in the previously accessed digital media item; and
- decrementing the count.

16. The method of claim 13, further comprising:
- sending an indication that at least one digital media item previously delivered to the user system has been disabled due to expiration of a time period for reviewing the digital media item on the user system.

17. The method of claim 16, further comprising:
- permitting the expired digital media item to be renewed by a user at the user system.

18. The method of claim 13, where M is an integer value greater than or equal to two.

* * * * *